Aug. 31, 1948.　　　　L. L. LIBBY　　　　2,448,036
SIMULATING IMPEDANCE SYSTEM
Filed April 18, 1946
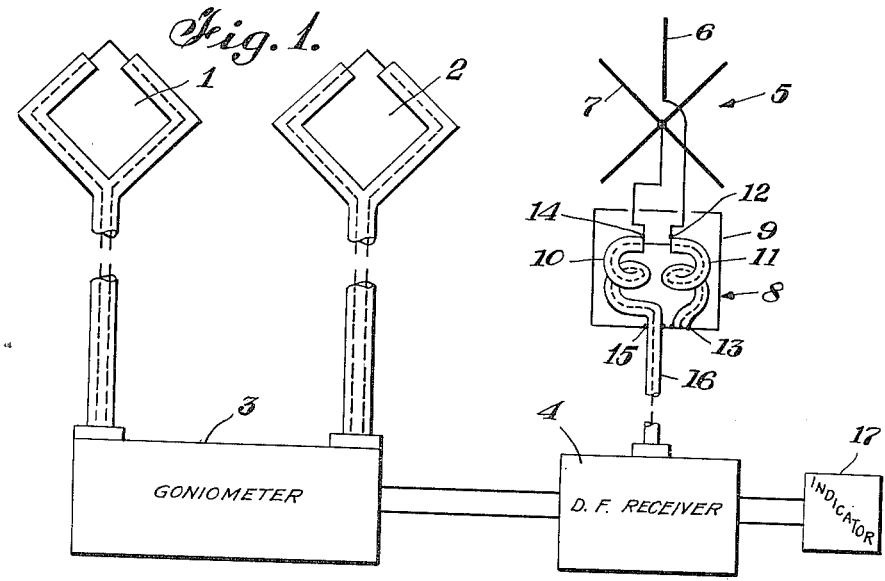
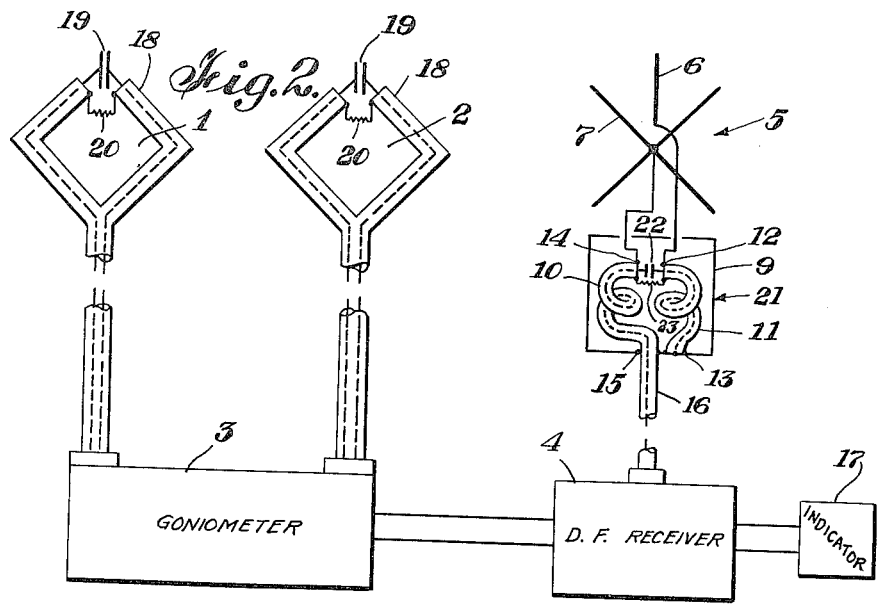
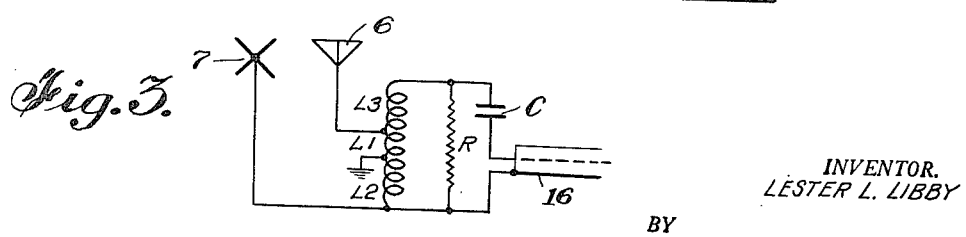
INVENTOR.
LESTER L. LIBBY
BY
ATTORNEY Patented Aug. 31, 1948

2,448,036

UNITED STATES PATENT OFFICE 2,448,036

SIMULATING IMPEDANCE SYSTEM

Lester L. Libby, East Orange, N. J., assignor to Federal Telecommunication Laboratories, Inc., New York, N. Y., a corporation of Delaware Application April 18, 1946, Serial No. 663,127

5 Claims. (Cl. 178—44)

1

This invention relates to impedance systems for simulating the characteristics of impedance systems of distributed constants.

For certain purposes, it becomes desirable to provide an impedance system of preferably compact dimensions to simulate the characteristics of a relatively larger system having distributed circuit constants. For example, in certain types of direction finders loop antennas are used in conjunction with a sensing antenna arrangement. In order to have the sensing antenna "track" the loop antennas over a range of frequencies, that is, in order to have the impedance in the sensing antenna system vary in accordance with the variation of the impedances in the loop antenna system, use has been made of simulating impedance systems, generally referred to as "dummy loops." These simulating impedance systems or dummy loops usually consist of lumped-constant circuit elements as is for example, described in my copending application, for "Loop antenna systems," Serial No. 582,207, filed March 12, 1945. However, it will be recognized that the variation of the impedance characteristics of a distributed constant circuit such as for example, a loop, will vary according to different laws from that pertaining to lumped-constant systems.

An object of the present invention is the provision of an improved impedance system for simulating the characteristics of a distributed constant system.

Another object is the provision of a simulating impedance system which will more closely simulate the characteristics of a loop antenna system.

Other and further objects of the present invention will become apparent and the invention will be best understood from the following description of embodiments thereof, reference being had to the drawings, in which:

Fig. 1 is a schematic and block diagram of a direction finding receiver employing a simulating impedance system embodying the present invention;

Fig. 2 is a similar diagram of a modified form of direction finding receiver embodying a modified form of simulating impedance system in accordance with the present invention; and Fig. 3 is an equivalent circuit for the simulating impedance system of Fig. 2.

Referring now to Fig. 1, two shielded loops 1 and 2, respectively, which are arranged at right angles to each other, feed their output to a goniometer 3, whose output in turn is fed to a direction finding receiver 4 where it is mixed with energy from a sensing arrangement 5. The sensing arrangement 5 may include a sensing antenna 6 with a counterpoise 7. In order to have the sensing antenna system "track" with the loop antenna collection system, a simulating impedance system 8, which is to simulate the impedance characteristics of the loop antenna collecting system, is provided. The simulating impedance system 8 is comprised of a grounded metallic casing 9 which is preferably relatively small, in one given instance of a cylinder about four inches in diameter and four inches high. Within the grounded casing 9 are provided two coaxial coils 10 and 11 respectively of miniature coaxial transmission line, said line being in one given instance about .040 inch in diameter and having a characteristic impedance of 50 ohms.

Antenna 6 is connected to one end 12 of the outer conductor of coaxial line coil 11, the other end 13 of the outer conductor being grounded to the casing 9 at the bottom thereof. The counterpoise 7 is connected to the outer conductor of coaxial line coil 10 at end 14 thereof, the opposite end 15 being grounded. At end 13, the inner conductor of coaxial line coil 11 is connected to ground, the end of the inner conductor at end 12 being connected to the inner conductor of coaxial line 10. At end 15 of coaxial line 10, an opening is provided in the cylinder 9 and the coaxial line 10 is extended, as indicated at 16, to form a transmission line coupling the simulating impedance system 8 to the direction finding receiver 4. Within the direction finding receiver 4 the energy from the sense antenna system is mixed with that from the loop antenna system and the output is then fed to an indicator 17.

To simulate the inductance of the loop antenna system, the simulating impedance system 8 is dimensioned so that the inductance of the outer conductor of transmission line 10 from end 14 to end 15, is equal to that of the outer conductor of transmission line 11 from end 12 to 13. These two outer conductor inductances plus the inductance from end 12 to 13 within coil 11, are preferably made equal to a half of the inductance of the shield of loops 1 or 2. This value is selected as a half to take advantage of the image effect of such arrangements. It will be recognized, of course, that if desired, the value of these inductances of the simulating impedance system may be made equal to the inductance of the shield of loops 1 or 2. The inductance within coil 11 from end 12 to end 13 has a true transmission line characteristic and, therefore, tends to track with the transmission line characteristics of loops 1 and 2. In order to secure balance with respect to ground, the inductance of the outer conductors of coaxial lines 10 and 11 from ends 14 to 15 and from ends 12 to 13, respectively, are made equal.

Referring now to the modified system illustrated in Fig. 2, in said system the two loop antennas 18 respectively each include a series condenser 19 in series with the inner conductor of the shielded loop and a resistor 20 coupling the adjacent ends of the shield of the loop. The addition of condenser 19 and resistor 20 tends to produce a flatter characteristic over a frequency band for both loops as is more fully explained in my aforementioned copending application Serial No. 582,207. In the simulating impedance system of Fig. 2, which is designated by the numeral 21, a condenser 22 is placed in series between the inner conductors of coaxial line coils 10 and 11 to simulate condenser 19 and likewise a resistor 23 is connected to the outer conductor of coaxial line coil 10 at end 14 and is connected at its other end to the outer conductor of coaxial line 11 at end 12. Resistor 23 simulates the effect of resistor 20 in the shielded loops.

Referring now to the equivalent circuit in Fig. 3, $L_1$ represents the inductance of the outer conductor of transmission line coil 11 from end 12 to end 13; $L_2$ represents the inductance of the outer conductor of coil 10 from end 14 to end 15; $L_3$ represents the inductance from end 12 to end 13 within the transmission line coil 11; R represents the resistance of resistor 23 and C represents the capacity of condenser 22.

Utilizing the image effect, the following values would preferably substantially be employed:

$L_1+L_2+L_3=\frac{1}{2}$ the inductance of the loop shield;

$C=2$ times the capacity of condenser 19; and $R=\frac{1}{2}$ the resistance of resistance 20.

While I have described above the principles of my invention in connection with specific apparatus, and particular modifications thereof it is to be clearly understood that this description is made only by way of example and not as a limitation on the scope of my invention as set forth in the objects hereof.

I claim:

1. An impedance system comprising a pair of coils of coaxial transmission line, a pair of adjacent ends of the outer conductors of said coils being connected to a point of reference potential, with the inner conductor of one of said coils at its said adjacent end being also connected to said point, and with the inner conductor of the other of said coils at its said adjacent end being connected to the output, the opposite ends of said outer conductors being adjacent each other and serving as input, the inner conductors of said coil at said opposite ends being coupled to each other.

2. An impedance system according to claim 1 wherein the inductances of the outer conductors of said coils are substantially equal.

3. An impedance system according to claim 1 including a metallic housing within which the pair of coils are arranged and to which the said adjacent ends of said outer conductors are connected, said metallic housing serving as the point of reference potential.

4. An impedance system simulating a loop antenna comprising a pair of coils of coaxial transmission line, the inductances of the outer conductors of said coils being substantially equal, a pair of adjacent ends of said outer conductors being connected to ground, with the inner conductor of one of said coils at one of said adjacent ends being also connected to ground and with the inner conductor of the other of said coils at its adjacent end being connected to the output, the opposite ends of said outer conductors being adjacent each other and serving as input, the inner conductors of said coils at said opposite ends being coupled to each other, the sum of the inductance of the outer conductors of said coils plus the inductance within said one of said coils being equal to substantially half the inductance of the loop antenna.

5. An impedance system simulating the characteristics of a shielded loop having a condenser in series with the inner conductor at the gap of said loop and a resistor connecting the two ends of the shield at said gap, comprising a pair of coils of coaxial transmission line, the inductance of the outer conductors of said coils being substantially equal, a pair of adjacent ends of said outer conductors being connected to ground with the inner conductor of one of said coils at its said adjacent end being also connected to ground and with the inner conductor of the other of said coils at its adjacent end being connected to the output, the opposite ends of said outer conductors being adjacent each other and serving as input, a condenser connected in series with the inner conductors of said coils at said opposite ends, a resistor connecting the outer conductor of said one coil to the outer conductor of said other coil at said opposite ends.

LESTER L. LIBBY.